Feb. 20, 1968        B. RUDLOFF        3,369,955
APPARATUS FOR FORMING CORRUGATED SHEETS
Filed March 16, 1964        2 Sheets-Sheet 1
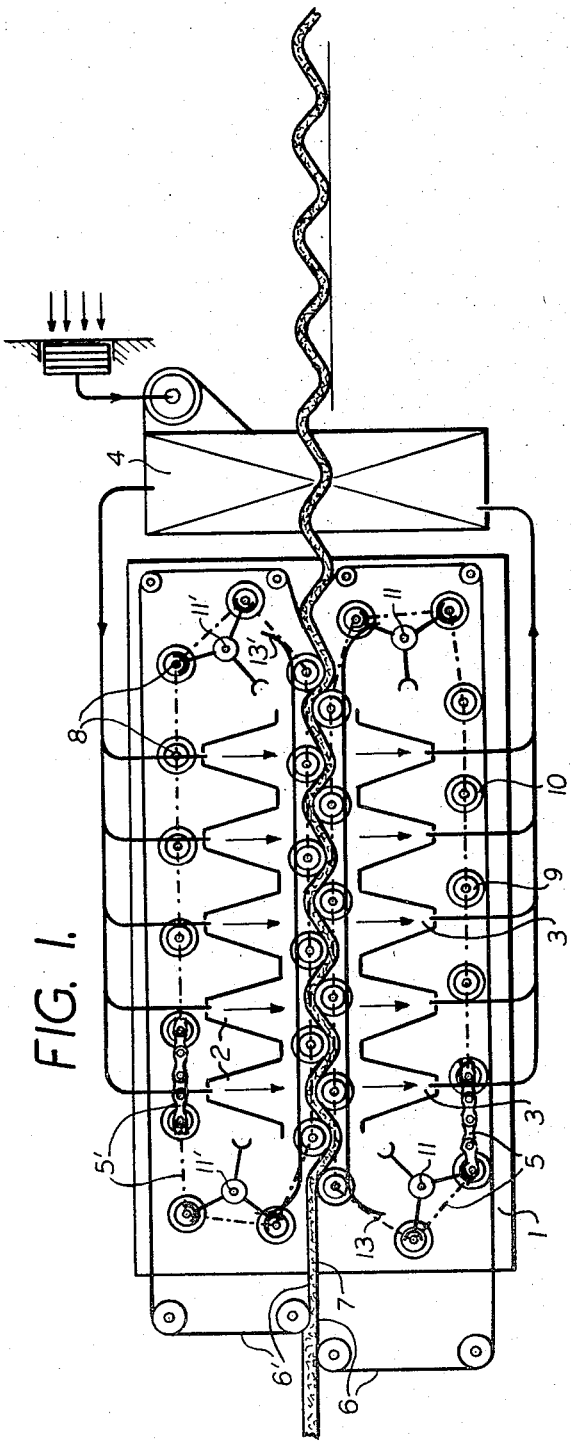
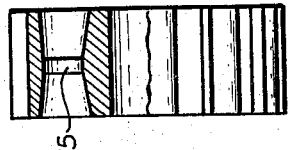
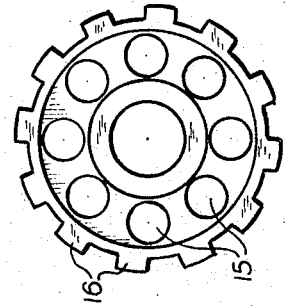
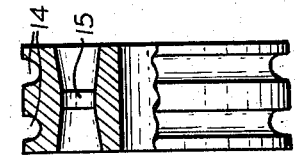
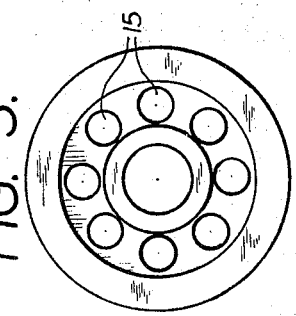
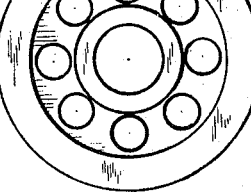
INVENTOR
BERNARD RUDLOFF
BY *Ernest F. Montague*
ATTORNEY.

Feb. 20, 1968      B. RUDLOFF      3,369,955
APPARATUS FOR FORMING CORRUGATED SHEETS
Filed March 16, 1964      2 Sheets-Sheet 2

INVENTOR
BERNARD RUDLOFF
BY
ATTORNEY.

United States Patent Office 3,369,955
Patented Feb. 20, 1968

3,369,955
APPARATUS FOR FORMING
CORRUGATED SHEETS
Bernard Rudloff, Rosenweirhof, Marckholsheim,
Bas-Rhin, France
Filed Mar. 16, 1964, Ser. No. 351,935
Claims priority, application France, Dec. 17, 1963,
7,931
8 Claims. (Cl. 156—588)

The present invention relates to the manufacture of panels, in general, and to an apparatus for the manufacture of flat or corrugated panels of polymerized fibers, in particular.

Plates or pads with flat surfaces have heretofore been manufactured of felted padding and insulation materials of polymerized textile fibers, especially for the purpose of providing insulating, fireproof, sterile and decay-proof materials, which may have a hardness and compactness similar to wood.

It is an object of the present invention to provide an apparatus for the manufacture of flat or corrugated panels of fibers and polymerized materials which permits these materials, as materials for building, acoustic and thermal insulation, and for the covering of walls or ceilings.

It is another object of the present invention to provide an apparatus which is constituted by addition, to a drying tunnel in which there is effected the polymerization of the sheet which has just been formed in its passage through the rolling train, of two endless chain assemblies moving synchronously with two perforated conveyor belts, one below the lower belt and the other above the working length of the upper belt. Upon tubular axles of the chain assemblies there are mounted in staggered and freely rotatable fashion, rollers which, along the working length of the chain assemblies, roll on guide rails having variable spacing, in such a fashion that the assembly comprising the sheet and the working lengths of the two conveyor belts follows an undulating path with regulatable height of undulation, while being subjected to the currents of hot air passing therethrough effecting the polymerization, which pass through the assembly without being impaired by the rollers which for this purpose are provided with appropriate grooves.

With these and other objects in view which will become apparent in the following detailed description, the present invention will be clearly understood in connection with the accompanying drawings, in which:

FIG. 1 is a diagrammatic view of the various elements of the drying tunnel;

FIGS. 3 and 3a show one embodiment of a roller;

FIGS. 4, 5 and 5a illustrate two variants thereof; and

Figure 2:
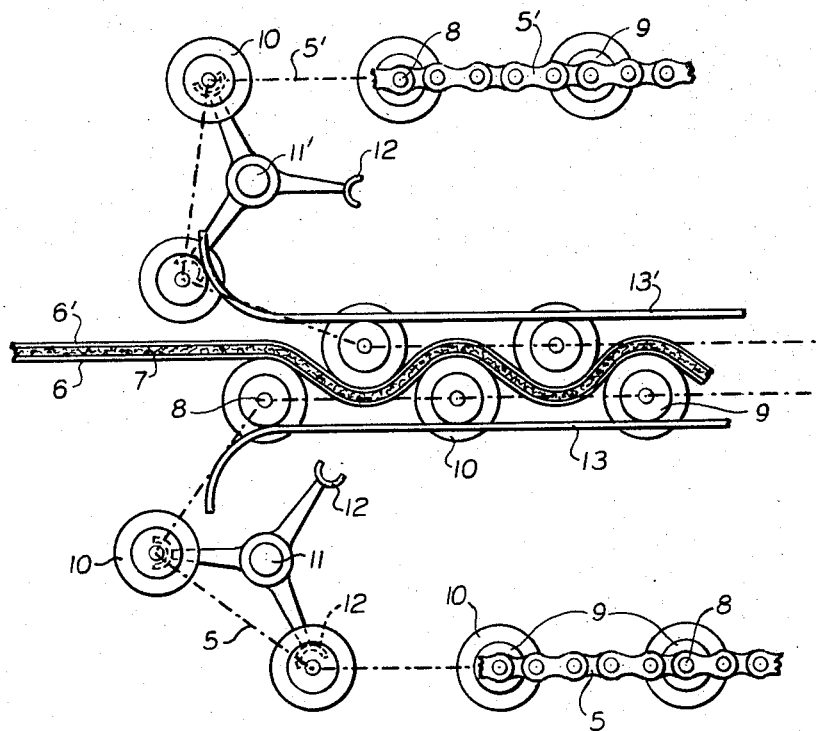
FIG. 2 is an enlarged fragmentary view showing the drive of the two chains.

Referring now to the drawings, and more particularly to FIG. 1, a drying tunnel 1 is illustrated in which is effected a polymerization of materials constituting a sheet 7 previously formed in a known manner by rolling of fiber flock charged with an appropriate quantity of artificial resins, fireproofing products and possibly addition products for obtaining the necessary compactness and hardness. The tunnel comprises cones 2 for the distribution of the hot air coming from a heater 4 and lower inverted cones 3 for suction of this air effecting passage through perforated conveyor belts 6 and 6', respectively, and the sheet 7. Two endless chain assemblies 5 and 5', respectively, are mounted below, above and along conveyor belts 6 and 6', respectively, for effecting a translational movement of the sheet.

Figure 6:
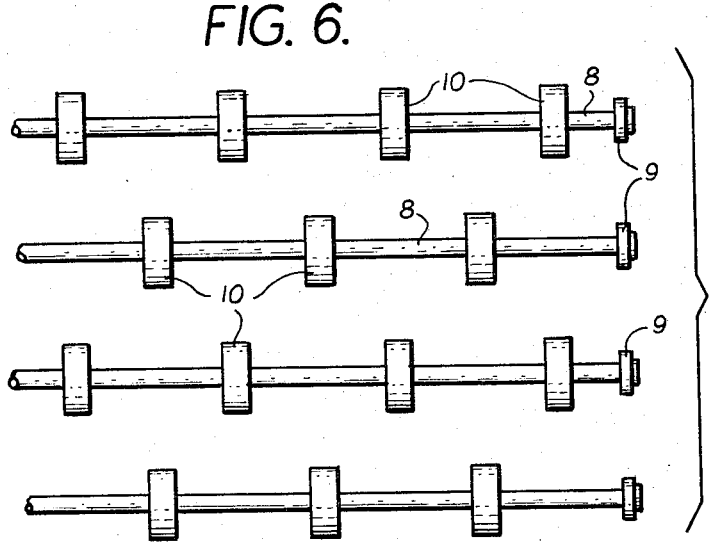
FIG. 6 shows the principle of the arrangement of the rollers on the chain axles.

The chain assemblies 5 and 5' are each formed by two chains of the ladder or sprocket type interconnected by axles 8 in the form of rods or tubes with length slightly greater than the width of the sheet 7. Near the end of the axles 8 there are mounted ball bearings 9 and on the axles 8 there are mounted, in staggered and freely rotatable fashion, narrow rollers 10 as shown in FIG. 6.

The drive of the chain assemblies 5 and 5' synchronously with the conveyor belts 6 and 6' is effected (FIG. 2) by skeleton sprockets 11 and 11' each with three arms, having fork-shaped ends 12 which engage successively with the axles 8 during rotation of the sprockets 11 and 11', at the ends of the axles 8. These skeleton sprockets are more suitable than conventional chain sprocket wheels which would be clogged too easily by fluff and particles of the resins.

A pair of guide rails 13' is provided on either side above the assembly of conveyor belts 6 and 6' and sheet 7, and another pair of guide rails 13 on either side below the assembly, to guide the axles 8 along the working length of each of the two chains assemblies, and to insure, by the rolling of ball bearings 9 on these rails, the smooth and easy movement of the chains. Accordingly along the entire polymerization passage there is insured a corrugation of the sheet 7 in sandwich abutment between the two conveyor belts 6 and 6'. In the translational movement, one of the chain assemblies is staggered by a half roller interval in relation to the other. The rollers 10 of the lower chain assembly 5 lift the conveyor belts 6 and 6', and sheet 7 therebetween, along the working length of the lower rails 13 on which the bearings 9 of the axles 8 roll, while the assembly is depressed by the rollers 10 of the upper chain assembly 5', which moves along the lower face of the upper guide rail 13', against which face the bearings 9, on the axles of the upper chain assembly, roll. The pairs of upper and lower guide rails 13' and 13, respectively, are adjustably disposed for regulating the spacing corresponding to the desired height of the undulations, this height vanishing to zero for manufacturing flat sheets.

At least one of the chain assemblies 5 and 5' is adjustable in height according to the thickness of the sheet.

It should be noted that the guides 13 and 13' possess the necessary rigidity to ensure the pressure for formation of the corrugations on the sheet 7.

The polymerization is effected through the intermediary of the air distribution cones 2 and the inverted air suction cones 3. The current of hot air supplied through a conduit under pressure from the heater 4 is in no way impaired by the presence of the narrow rollers 10, which are placed in staggered fashion on the axles 8 on which they rotate freely (FIG. 6). Moreover the rollers are provided over their periphery with grooves 14 and transversely with passages 15 as shown in FIGS. 3 and 3a. As variants they can possess on their periphery various kinds of teeth 16 as illustrated in FIGS. 4, 5 and 5a. The hot air can accordingly be driven, without formation of eddies, through the assembly of the perforated porous conveyor belts 6 and 6' and the sheet 7.

After polymerization, the sheet 7, having acquired the desired flat or corrugated shape, on departure from the tunnel and when separated from the conveyor belts 6 and 6', can of course be subjected to any desired further operation such as vitrification, painting and lacquering on one or both faces, flocculation, and may be cut into panels of desired dimensions. The panels may be taken up by any handling means and transported to the machining and drilling stations.

By reason of the compactness and hardness which can be obtained and by reason of the polished or velvety appearance which they have acquired, the corrugated or flat panels constitute excellent building materials, the lightness and strength of which permit use as acoustic or thermal insulation elements or as coverings for walls or ceilings and for roofs.

While I have disclosed several embodiments of the present invention, it is to be understood that these embodiments are given by example only and not in a limiting sense, the scope of the present invention being determined by the objects and the claims.

I claim:
1. An apparatus for the manufacture of panels of fibers and polymerized materials comprising
   two endless conveyor belts disposed in vertical spaced and parallel relationship,
   means for providing an unpolymerized sheet of fibers and resin between said two conveyor belts in sandwich relationship,
   said two endless conveyor belts being perforated and permitting air to pass therethrough,
   two chain assemblies for synchronously moving each of said two endless conveyor belts, respectively, thereby moving said sheet therewith,
   means for providing and distributing heated air to a plurality of positions along one of said two endless conveyor belts adjacent said sheet and for removing said heated air from a plurality of corresponding positions along the other of said two endless conveyor belts adjacent said sheet, said heated air thereby passing through said conveyor belts and said sheet therebetween and effecting the polymerizing of said sheet,
   each of said two chain assemblies comprises,
      a plurality of axles,
      an endless chain means connecting said plurality of axles in spaced parallel relationship relative to one another and relative to said each of said two endless conveyor belts,
      a plurality of rollers disposed on each axle in spaced relationship from each other,
      driving means for moving said endless chain means and said axles, and
      an adjustable pair of guide rail means disposed parallel to and in spaced and adjustable relationship to said each of said two endless conveyor belts adjacent said sheet for guiding said plurality of axles and said rollers thereon against said each of said two endless conveyor belts adjacent said sheet.

2. The apparatus, as set forth in claim 1, wherein
said rollers are mounted for free rotation on said axles, and
said axles being of a length which is slightly greater than the width of said sheet.

3. The apparatus, as set forth in claim 2, wherein
said rollers are disposed in staggered fashion on said axles, and
said rollers are formed with peripheral grooves.

4. The apparatus, as set forth in claim 2, wherein
said rollers are formed with transverse passages therethrough.

5. The apparatus, as set forth in claim 2, further comprising
ball bearings provided on the ends of said axles, and said ball bearings rolling on said guide rail means.

6. The apparatus, as set forth in claim 2, wherein
said driving means comprises three-armed levers rotatably engaging said axles by which said chain means are driven in translational movement synchronously with said two endless conveyor belts.

7. The apparatus, as set forth in claim 2, wherein
said plurality of axles of each of said two chain assemblies relative to the other is offset by half the spacing of said axles from one another, so that said two endless conveyor belts adjacent said sheet are moved in corrugated fashion.

8. The apparatus, as set forth in claim 1, wherein at least one of said chain assemblies is displaceable in height as a function of the thickness of said sheet.

References Cited

UNITED STATES PATENTS

| 1,956,714 | 5/1934 | Graff-Baker | 74—245 |
| 2,350,996 | 6/1944 | Atkinson et al. | 156—595 |
| 2,543,101 | 2/1951 | Francis | 156—376 |
| 2,695,652 | 11/1954 | Segil | 156—595 |
| 3,032,452 | 5/1962 | Magnaguagno | 156—595 |
| 3,077,000 | 2/1963 | Huisman et al. | 156—595 |
| 3,102,776 | 9/1963 | Steinman et al. | 156—595 |

FOREIGN PATENTS

| 21,937 | 11/1895 | Great Britain. |
| 453,205 | 12/1948 | Canada. |

EARL M. BERGERT, *Primary Examiner.*

W. E. HOAG, *Assistant Examiner.*